United States Patent Office 3,366,638
Patented Jan. 30, 1968

---

3,366,638
1-(1'-HYDROCARBYL SUBSTITUTED-4'-HYDROXY-4'-PIPERIDYL)-2-KETONES
Hans Herbert Kühnis, Hugo Ryf, and Rolf Denss, Basel, Switzerland, assignors to Geigy Chemical Corporation, Greenburgh, N.Y., a corporation of Delaware
No Drawing. Filed July 15, 1964, Ser. No. 382,955
Claims priority, application Switzerland, July 19, 1963, 9,052/63, 9,053/63; July 26, 1963, 9,324/63, 9,325/63
9 Claims. (Cl. 260—294)

ABSTRACT OF THE DISCLOSURE

The application concerns 1-(1'-hydrocarbyl substituted -4'-hydroxy-4'-piperidyl)-2-ketones. The compounds are prepared by a new aldol type condensation wherein a 4-piperidone is reacted with a 2-alkanone in the presence of an aldol condensation catalyst. The compounds are useful as analgetics and antitussives.

---

The present invention concerns aliphatic and aromatic-aliphatic ketones having valuable pharmacological properties.

It has surprisingly been found that ketones of the general formula

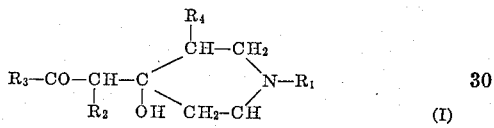

(I)

wherein $R_1$ represents hydrogen, an alkyl radical having at most 12 carbon atoms, an alkenyl radical having 3 to 5 carbon atoms, the cyclopropylmethyl radical or a phenyl-alkyl radical having 7 to 9 carbon atoms,
$R_2$ represents hydrogen or the methyl radical, and
$R_3$ represents an alkyl radical having at most 4 carbon atoms, the phenyl radical, a phenylalkyl radical having 7 to 9 carbon atoms, the styryl radical, or together with $R_2$, it represents an optionally methyl-substituted trimethylene to hexamethylene radical, preferably trimethylene, tetramethylene and 1-methyl-tetramethylene, and
$R_4$ represents hydrogen, or the methyl radical and their pharmaceutically acceptable salts with inorganic and organic acids, have valuable pharmacological properties, in particular an excellent analgesic activity on both oral and parenteral application, and strong antitussive activity. In contrast to other known analgesics, they have no parasympathicolytic properties but especially those in which $R_3$ is alkyl have a mild para-sympathomimetic action. At the same time, they have only relatively slight toxicity and are suitable, therefore, for the relief and removal of pain of various origin and also of tussive irritation.

In the compounds of the Formula I and in the starting materials used therefor which are mentioned below, $R_1$ is, for example, hydrogen, alkyl radicals such as the methyl, ethyl, n-propyl, isopropyl, n-butyl, isobutyl, sec. butyl, n-amyl, isoamyl, n-hexyl, n-octyl, n-decyl or n-dodecyl radical; alkenyl radicals such as the allyl, crotyl, methallyl or γ,γ-dimethallyl radical; the cyclopropylmethyl radical or phenylalkyl radicals such as the benzyl, β-phenyleythl or γ-phenylpropyl radical.

$R_3$, by itself, is, for example, the methyl, ethyl, n-propyl, isopropyl, n-butyl, isobutyl, sec. butyl, tert. butyl, phenyl, benzyl, α-methylbenzyl, α-phenylethyl, β-phenyl-ethyl or styryl radical (β-phenylvinyl radical).

Also, $R_3$, together with $R_2$, form, for example, the trimethylene, tetramethylene, 1-methyltetramethylene, pentamethylene or hexamethylene radical.

Especially the compounds of the formula

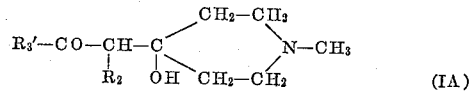

(IA)

wherein $R_2$ has the same meaning as in Formula I.
and
$R_3'$ is alkyl of from 1 to 4 carbon atoms, have strong antitussive activity while their lack of, or weak response to the tail-flick test on mice indicates that they are substantially non-habit forming [Archer et al., J. Medic. Chem. 7, 123 (1964)].

Moreover, these compounds show good response in the phenylquinone writhing test on rats. These compounds are, therefore, indicated for use as antitussive and mild analgesic agents.

It has also been found that the compounds of the general formula I can be produced in a surprisingly easy manner by reacting a 4-piperidone of the formula

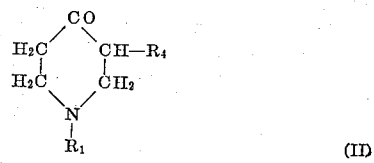

(II)

with a ketone of the formula $$R_3\text{—CO—CH}_2\text{—}R_2 \qquad (III)$$

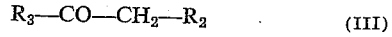

wherein $R_1$, $R_2$, $R_3$ and $R_4$ have the meanings given in Formula I, the reaction being performed in the presence of a condensation catalyst of the aldol condensation type.

Among the above condensation catalysts, there are basic condensing agents, namely, on the one hand, inorganic bases such as sodium hydroxide and organic bases such as piperidine, piperazine and, in anhydrous medium or in the absence of solvents, also alkali metal alcoholates and, on the other, basic ion exchangers, preferably those having quaternary ammonium groups such as, for example, Amberlite IRA 400 (OH⊖), furthermore, relatively weak basic ion exchangers can be used such as Amberlite IR 4B, which condensing agents can be used in a batch process or continuous process. Depending on the solubility of the starting materials, water, aqueous and also an anhydrous lower alkanol or another polar solvent can be used as reaction medium.

Examples of acid condensing agents are ammonium salts such as, for example, ammonium acetate alone or combined with glacial acetic acid and, optionally, an inert solvent such as, for example, benzene; also acid ion exchangers such as, for example, Amberlite IR 120(H⊕), in water or an aqueous low alkanol as reaction medium.

The condensation, especially of the compounds falling under Formula IA, but in which only one of $R_2$ and $R_3'$ is methyl, is preferably performed at room temperature to moderately raised temperature, i.e. the preferred temperature range lies between room temperature (15 to 25° C.) and 80° C., preferably 20 to 60° C. At higher temperatures, e.g. at the boiling temperature of higher-boiling solvents used, water is split off after the hydroxy compound has been formed so that the corresponding compound with a cyclic double bond is formed as main product. Naturally, the exact temperature limit at which this takes place depends also on the specific starting materials, the condensing agent and the solvent, as well as on the concentration and on the duration of the reaction.

Surprising and decisive for the success of the above process is the fact that with mixtures of ketones of the general Formulas II and III, both of which contain both reactive carbonyl groups and also methylene groups, under the varied conditions of aldol condensation the homo-condensations of the reaction components are so insignificant compared to a selective mixed condensation that compounds of the general Formula I are formed as main products, whereas in aldol condensations with two different reaction components, generally only relatively uniform reaction products are to be expected if an aldehyde is condensed with a ketone or with another aldehyde of a different type.

Starting materials of the general Formula II are 4-piperidones optionally substituted as defined in the 1-position and 3-methyl-4-piperidones. Compounds of this general formula are already known and others can be produced in an analogous manner. Suitable starting materials of the general Formula III are, for example, methyl-alkyl ketones having an alkyl group with a straight or branched chain such as, e.g. acetone, butanone, methyl-n-propyl ketone, methyl-isopropyl ketone, methyl-n-butyl ketone, methyl-isobutyl ketone, methyl-sec. butyl ketone and pinacolin, on the use of which compounds having a hydrogen atom as $R_2$ are formed; also diethyl ketone and ethyl-sec. alkyl ketones such as ethyl-isopropyl ketone which yield compounds of the general Formula I having a methyl group as $R_2$; and also cycloalkanones such as cyclopentanone, cyclohexanone, cycloheptanone and cyclooctanone, as well as aromatic-aliphatic and araliphatic-aliphatic ketones such as acetophenone, propiophenone, benzyl-methyl ketone, ($\alpha$-phenyl-ethyl)-methyl ketone, ($\beta$-phenyl-ethyl)-methyl ketone, ($\gamma$-phenyl-propyl)-methyl ketone and benzalacetone.

The compounds of the general Formula I can also be produced analogously to a multiple-step process which has been suggested in the literature to take the place of the direct aldol condensation which cannot be performed between a ketone and an aldehyde to form the corresponding unsaturated aldehyde.

According to this process, a ketimine (Schiff's base) of the general Formula IV

(IV)

wherein $R_5$ represents a hydrocarbon radical, in particular the cyclohexyl radical, and $R_2$ and $R_3$ have the meanings given in general Formula I, is converted into its alkali metal compound, particularly the lithium compound, the latter is reacted with a compound of the general Formula V

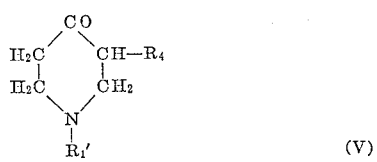

(V)

wherein $R_1'$ has the meaning given in general Formula I for $R_1$ with the exception of hydrogen, and $R_4$ has the meaning given in Formula I, under anhydrous conditions, and the adduct of the general Formula VI

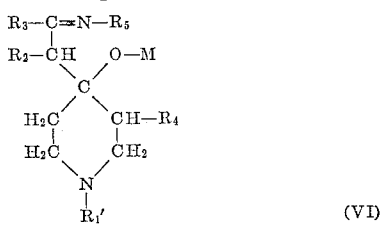

(VI)

wherein M is an alkali metal atom, in particular a lithium atom, and $R_1'$, $R_2$, $R_3$, $R_4$ and $R_5$ have the meanings given in general Formulae V or I, is hydrolysed under mild conditions, preferably in acid medium. For example, a ketimine of the general Formula IV in abs. ether is converted in the cold with lithium-diisopropylamine, which in its turn is produced from phenyl lithium and diisopropylamine in ether, into its lithium compound and the latter is reacted, also in the cold in the same medium, with a compound of the general Formula V. The corresponding hydroxy compound is liberated from the adduct of the general Formula VI with water and then this hydroxy compound is hydrolysed, e.g. with 2 N sulphuric acid, at room temperature up to moderately raised temperatures of about 60°. Sulphuric acid of a different concentration or dilute hydrochloric acid can also be used for the hydrolysis, but always more energetic reaction conditions are to be avoided as otherwise water is split off. The ketimines necessary as starting materials of the general Formula IV can be produced, for example, by heating the corresponding ketone with a primary amine, particularly cyclohexylamine, in an inert solvent which azeotropically distills off with water such as toluene. Some ketimines can be purified by distillation under high vacuum, other cannot be distilled without decomposition and so are used as crude products.

Compounds of the general Formula I wherein the radical $R_3$ is bound to the carbonyl group by way of a methylene group are obtained by a third process by treating at room temperature to moderately raised temperature, a compound of the general Formula VII

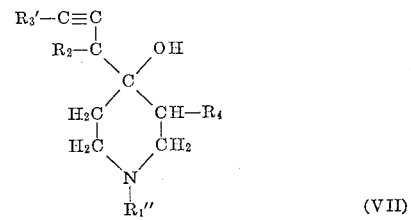

(VII)

wherein $R_1''$ represents a radical corresponding to the definition for $R_1$ or the benzyloxycarbonyl radical, and $R_3$ represents hydrogen or a radical corresponding to a radical $R_3$ defined in general Formula I with the addition of the methylene group —$CH_2$—, and $R_2$ and $R_4$ have the meanings given above, with an aqueous mineral acid containing mercury ions, and splitting off any benzyloxycarbonyl radical $R_1''$ present by hydrogenolysis. 10–84% sulphuric acid, also, e.g. about 15% to 36% (concentrated) hydrochloric acid are suitable as aqueous mineral acids for the hydration. The higher the concentration of the acid, the lower is the reaction temperature chosen. On using 84% sulphuric acid, the reaction is performed preferably at room temperature; with 10% sulphuric acid or about 1:1 dilute hydrochloric acid, it is performed at 50–60°. Any benzyloxycarbonyl radical $R_1''$ present can be split off, for example by treating a corresponding intermediate product with hydrogen in the presence of a hydrogenation catalyst such as, e.g. palladium on charcoal, in a suitable organic solvent such as, e.g. ethanol.

Some representative starting materials of the general Formula VII containing hydrogen as $R_2$ and $R_3'$ are described in French Patent 665M and others can be produced in the manner described therein, i.e. by reacting propargyl bromide with amalgamated magnesium, zinc or aluminium in a mixture of tetrahydrofuran and toluene and condensing the organometallic compound obtained with a 4-piperidone substituted corresponding to the definition of $R_1''$ and $R_4$. Instead of the propargyl bromide, also analogous compounds can be used such as, e.g. 3-bromo-1-butine or 1-bromo-2-butine, which yield starting materials of the general Formula VII containing a radical $R_2$ and/or $R_3'$ different from hydrogen. The process described in the French patent mentioned is modified advantageously in that instead of using coarse aluminium powder simply amalgamated with mercury chloride, one is used which is first amalgamated with metallic mercury and is then treated with mercury chloride.

Starting materials of the general Formula VII which contain a hydrogen atom as $R_1''$ can be produced, for example, by the process mentioned above using double the molar amount of propargyl bromide or an analogue thereof and a correspondingly increased amount of metal.

On using 1-benzyloxycarbonyl-4-piperidone instead of 4-piperidone the use of double the amount of propargyl bromide can be avoided and often a more uniform reaction sequence can be attained so that it is often worth while to introduce the benzyloxycarbonyl group and finally remove it hydrogenolytically.

If, instead of ice and acetic acid (see Example 4 of the above patent), ice and a mineral acid, e.g. concentrated hydrochloric acid are used to decompose the reaction mixture resulting from the organometallic reaction, then an organic and a mineral acid aqueous phase are obtained. The latter contains the reaction components for the process according to the invention, i.e. the desired compound of general Formula VII and mercury ions in mineral acid, e.g. hydrochloric acid, solution and, provided care is taken to assure a suitable acid concentration by a suitable ratio of ice to acid, e.g. equal parts of ice and concentrated hydrochloric acid, this itself is the starting mixture for the process according to the invention, on warming which the end product of general Formula I is formed.

Finally compounds of the general Formula I containing hydrogen as $R_1$ and which are produced by one of the above processes, can be converted into compounds of Formula I containing $R_1'$ instead of $R_1$, by reacting the former with a reactive ester of a compound of general Formula VIII

$$R_1'\text{—OH} \qquad \text{(VIII)}$$

wherein $R_1'$ has the meaning given in general Formula V. The reaction is performed, for example at room temperature or at moderately raised temperature in a suitable organic solvent such as, e.g. ethanol, acetone, ethyl acetate or dimethyl formamide. Optionally, the reaction can be accelerated by the use of an acid binding agent such as, e.g. potassium carbonate and/or of potassium iodide. Suitable reactive esters are, in particular, hydrohalic acid esters such as the bromides, chlorides and iodides, also arylsulphonic acid esters, e.g. p-toluene sulphonic acid ester and also easily accessible sulphuric acid esters such as dimethyl sulphate and diethyl sulphate.

The compounds of general Formula I form salts, some of which have good water solubility, with inorganic and organic acids such as hydrochloric acid, hydrobromic acid, sulphuric acid, nitric acid, phosphoric acid, methane sulphonic acid, ethane disulphonic acid, β-hydroxyethane sulphonic acid, acetic acid, propionic acid, maleic acid, fumaric acid, lactic acid, malic acid, tartaric acid, citric acid, benzoic acid, salicylic acid, phenylacetic acid and mandelic acid.

The following examples illustrate the performance of the processes according to the invention but are by no means the only ways of performing same. The temperatures are given in degrees contigrade.

*Example 1*

300 g. of Amberlite IRA 400 (OH⊖) which has been washed neutral and previously stirred for 15 hours with 2 N sodium hydroxide solution at room temperature, are added to a mixture of 226 g. of 1-methyl-4-piperidone and 120 g. of acetone in 700 ml. of water, and the mixture is stirred for 20 hours at 30°. The ion exchanger is then filtered off and the filtrate is evaporated in a rotary evaporator in vacuo. The residue is taken up in chloroform and the solution is dried with sodium sulphate and concentrated. The crude product is distilled in vacuo whereupon 1 - (1′-methyl - 4′ - hydroxy-4′-piperidyl)-2-propanone is obtained. B.P.$_{.12}$=125–130°.

To convert into the hydrochloride, the above base is dissolved in a mixture of ether and isopropanol 5:1 and abs. ethereal hydrogen chloride solution is added to the solution until no more hydrochloride precipitates. The hydrochloride is filtered off and recrystallised from isopropanol. M.P. 125–127°.

To produce the citrate, the free base is dissolved in acetone and a saturated solution of citric acid in acetone is added until the solution has an acid reaction (pH 4). The salt which precipitates is filtered off and recrystallised from acetone/methanol. The 1-(1′methyl-4′-hydroxy-4′-piperidyl)-2-propanone citrate melts at 103–105°.

*Example 2*

67.8 g. of 1-methyl-4-piperidone are added dropwise at room temperature to a mixture of 120 g. of Amberlite IRA 400 (OH⊖) which has been washed neutral and previously stirred with 2 N sodium hydroxide solution for 15 hours at room temperature and 176 g. of acetone, the addition being made while stirring vigorously within 5 hours, and the mixture is then stirred for another 19 hours. The ion exchanger is then filtered off and washed with methanol and the filtrate is evaporated in a rotary evaporator in vacuo. The crude product is distilled under high vacuum whereupon 1 - (1′methyl - 4′hydroxy - 4′-piperidyl)-2-propanone is obtained, B.P.$_{0.01}$ 75°. (Re salts, cf. Example 1.)

The following compounds are produced in an analogous manner:

1-(1′-methyl-4′-hydroxy-4′-piperidyl)-2-butanone, B.P.$_{0.01}$ 95°, citrate M.P. 145–146°;
1-(1′-methyl-4′-hydroxy-4′piperidyl)-pentanone, B.P.$_{0.003}$ 119–121°, citrate M.P. 126–128°;
1-(1′-methyl-4′-hydroxy-4′-piperidyl)-2-hexanone, B.P.$_{0.01}$ 116–118°;
1-(1′-methyl-4′-hydroxy-4′-piperidyl)-3-methyl-2-butanone, B.P.$_{0.005}$ 85°, citrate M.P. 132–134°;
2-(1′-methyl-4′-hydroxy-4′-piperidyl)-cyclohexanone, B.P.$_{0.01}$ 125°, citrate M.P. 95–96°;
2-(1′-methyl-4′-hydroxy-4′-piperidyl)-cyclopentanone, B.P.$_{0.003}$ 115–118°, M.P. 70°, citrate M.P. 157–158°;
1-(1′-methyl-4′-hydroxy-4′-piperidyl)-3-phenyl-2-propanone, B.P.$_{0.003}$ 132–135°;
α-(1′-methyl-4′-hydroxy-4′-piperidyl)-acetophenone, B.P.$_{0.01}$ 123–125°, hydrochloride M.P. 146–147°;
2-(1′-methyl-4′-hydroxy-4′-piperidyl)-3-pentanone, B.P.$_{0.008}$ 95–100°, citrate M.P. 130–132°;
1-(1′,3-dimethyl-4′-hydroxy-4′-piperidyl)-2-propanone, citrate M.P. 120°;
1-(1′3′-dimethyl-4′-hydroxy-4′-piperidyl)-2-butanone, citrate M.P. 140°;
1 - (1′ - allyl-4′-hydroxy-4′-piperidyl)-2-butanone, B.P.$_{0.01}$ 79–83°, citrate M.P. 66–67°.

*Example 3*

17.4 g. of acetone, 18.9 g. of 1-benzyl-4-piperidone and 15 g. of Amberlite IRA 400 (OH⊖), which has been washed neutral and previously stirred with 2 N sodium hydroxide solution for 15 hours at room temperature, are stirred for 24 hours at 50°. The ion exchanger is filtered off and washed with methanol and the filtrate is evaporated in a rotary evaporator in vacuo. The residue is distilled under high vacuum. The 1-(1′-benzyl-4′-hydroxy-4′-piperidyl)-2-propanone boils at 125° under 0.01 mm. pressure. The hydrochloride produced analogously to Example 1 melts at 166–168°.

In an analogous manner, on using 20.3 g. of 1-β-phenylethyl) - 4 - piperidone, 1 - [1′-(β-phenylethyl-4′-hydroxy-4′-piperidyl]-2-propanone is obtained, hydrochloride M.P. 127–129°, and on using 14.1 g. of 1-n-propyl-4-piperidone, 1 - (1′ - n - propyl-4′-hydroxy-4′-piperidyl)-2-propanone is obtained, B.P.$_{0.01}$ 80–82°, hydrochloride M.P. 137–139°.

*Example 4*

17.4 g. of acetone and 20 g. of Amberlite IR 4B are placed in a flask. 11.3 g. of 1-methyl-4-piperidone are then added dropwise within 5 hours while stirring and then the reaction mixture is stirred for 19 hours. The ion exchanger is filtered off, washed with methanol, the filtrate is evaporated in vacuo and the residue is distilled in vacuo. The 1-(1'-methyl-4'-hydroxy-4'-piperidyl)-2-propanone passes over at 80° under 0.005 mm. pressure. Compare Example 1.

*Example 5*

11.3 g. of 1-methyl-4-piperidine are added dropwise within 5 hours while stirring to 23.2 g. of acetone and 20 g. of Amberlite IRA 400 (OH⊖) in 20 ml. of methanol and the mixture is then stirred for another 19 hours. The ion exchanger is filtered off and washed with methanol. The filtrate is evaporated in a rotary evaporator and the 1-(1'-methyl-4'-hydroxy-4'-piperidyl)-2-propanone which remains is distilled under high vacuum. B.P.$_{0.001}$ 70–85°, compare Example 1.

*Example 6*

0.10 g. of sodium methylate are added while stirring to 11.3 g. of 1-methyl-4-piperidone and 5.8 g. of acetone whereupon the temperature of the reaction mixture rises to 40°. After standing for 8 hours at room temperature, the reaction mixture, which is now viscous, is dissolved in 80 ml. of chloroform and the solution is extracted with a little water and also twice with saturated sodium chloride solution. The chloroform solution is dried with sodium sulphate and evaporated and the residue is distilled under high vacuum whereupon 1-(1'-methyl-4'-hydroxy-4'-piperidyl)-2-propanone is obtained. B.P.$_{0.05}$ 80°. Compare Example 1.

*Example 7*

11.3 g. of 1-methyl-4-piperidone are added dropwise within 5 hours to a solution of 7.2 g. of acetone in 50 ml. of 2 N sodium hydroxide solution. The mixture is stirred for another 24 hours, then extracted with chloroform, the chloroform solution is dried with sodium sulphate and evaporated. On distilling the residue, 1-(1'-methyl-4'-hydroxy-4'-piperidyl)-2-propanone is obtained. B.P.$_{0.001}$ 70–85°, compare Example 1.

*Example 8*

(a) 11.3 g. of 1-methyl-4-piperidone are added dropwise within 4 hours at 40–50° to a mixture of 29.2 g. of benzylidene acetone and 20 g. of Amberlite IRA 400 (OH⊖ form, pretreated as described in the above examples) and then the reaction mixture is stirred for 15 hours at 40–50°. The ion exchanger is filtered off and washed with methanol, and the filtrate is evaporated in a rotary evaporator. On distilling the residue under high vacuum, 1 - (1' - methyl - 4' - hydroxy - 4' - piperidyl) - 3 - benzylidene - 2 - propanone passes over at 131–155° under 0.01 torr. The citrate prepared analogously to the above examples melts at 165–167°.

(b) Starting from 11.3 g. of 1-methyl-4-piperidone and 22.4 g. of 2-methyl-cyclohexanone, 2-(1'-methyl-4'-hydroxy-4'-piperidyl)-6-methyl-cyclohexanone is obtained in an analogous manner. B.P.$_{0.002}$ 119–127°, M.P. 125–126°.

*Example 9*

11.3 g. of 1-methyl-4-piperidone are added dropwise within 3 hours at 60° to a mixture of 21.6 g. of 2-butanone and 30 g. of Amberlite IR 120 (H⊕) in 60 ml. of water whereupon the mixture is stirred for 13 hours at 60°. After filtering and evaporating the filtrate an oil remains which, on being distilled under high vacuum yields 1-(1'-methyl-4'-hydroxy-4'-piperidyl)-2-butanone. B.P.$_{0.005}$ 80–83°. The citrate produced therefrom melts at 145–146°, compare Example 2.

*Example 10*

(a) 120 g. of acetophenone and 99 g. of cyclohexylamine in 300 ml. of abs. toluene are heated for 20 hours in a water separator. The yellow reaction solution is concentrated and the residue is distilled under high vacuum whereupon the Schiff's base, acetophenone-N-cyclohexylimine is obtained. It boils at 90–91° under 0.001 mm. pressure.

(b) 0.6 g. of lithium in 100 ml. of abs. ether are placed in a three-necked flask in an atmosphere of nitrogen and about a third of the solution of 6.75 g. of bromobenzene in 50 ml. of abs. ether is added dropwise while stirring. The reaction is started by heating in a water bath and then the remaining bromobenzene is added dropwise. Finally the dark brown solution is refluxed for 30 minutes. The phenyl-lithium solution obtained is poured into a second four-necked flask and cooled to −10°. 4.35 g. of diisopropylamine in 5 ml. of abs. ether are added dropwise within 15 minutes while stirring whereupon a greenish suspension is formed. After another 10 minutes, 8.5 g. of the Schiff's base obtained according to (a) in 10 ml. of abs. ether are added dropwise at 0° and the whole is stirred for 15 minutes. 4.8 g. of 1-methyl-4-piperidone in 5 ml. of abs. ether are then added dropwise and the mixture is stirred for another 15 hours. It is then decomposed with water, the phases are separated and the ethereal phase is washed with water, dried and concentrated. The crystal slurry is stirred with ether and filtered. The ω-(1-methyl - 4 - hydroxy - 4 - piperidyl) - acetophenone - N-cyclohexyl-imine obtained melts at 110–111°.

(c) 0.5 g. of the product obtained according to (b) and 5 ml. of 2 N sulphuric acid are heated for 3 hours at 60°. The reaction mixture is then made alkaline and extracted with chloroform, dried and concentrated. On distilling under high vacuum, ω-(1'-methyl-4'-hydroxy-4-piperidyl)-acetophenone is obtained, the hydrochloride of which melts at 146–147°, compare Example 2.

*Example 11*

(a) 10 g. of mercury are added to 4.05 g. of coarse aluminium powder and well mixed with a stirrer. Unused mercury is then decanted off. The amalgamated aluminium in 25 ml. of abs. tetrahydrofuran and 15 ml. of abs. benzene is then boiled for a short time with 15 mg. of mercury chloride and the whole is then stirred for 15 minutes. Of a total amount of 20.5 ml. of propargyl bromide, so much is added, without solvent, at 50–60° to start the reaction and to make the temperature rise towards 70°; afterwards the remaining propargyl bromide, diluted with 35 ml. of abs. benzene, is added. The mixture is stirred for 30 minutes. 50 g. of 1-(β-phenylethyl)-4-piperidone in 150 ml. of abs. benzene are then added slowly dropwise at 20–25° while cooling with ice and the mixture is stirred for another 15 hours. It is then decomposed with ice and 2 N hydrochloric acid, the aqueous phase is separated, washed with chloroform and made alkaline with concentrated sodium hydroxide solution and the base liberated is taken up in chloroform. The chloroform solution is dried and concentrated and the residue is distilled whereupon 1 - (β - phenylethyl) - 4 - (2' - propinyl) - 4-piperidinol is obtained, B.P.$_{0.03}$ 130–140°.

The following compounds, for example, are obtained in an analogous manner:

1-benzyl-4-(2'-propinyl)-4-piperidinol, B.P.$_{0.03}$ 128–135°;
1-methyl-4-(2'-propinyl)-4-piperidinol, M.P. 91–93°;
1-methyl-4-(1'-methyl-2'-propinyl)-4-piperidinol, B.P.$_{0.01}$ 75–78°;
1-ethyl-4-(2'-propinyl)-4-piperidinol,
1-n-butyl-4-(2'-propinyl)-4-piperidinol,
1-n-dodecyl-4-(2'-propinyl)-4-piperidinol,
1-(α-methyl-β-phenylethyl)-4-(2'-propinyl)-4-piperidinol,
1-(γ-phenylpropyl)-4-(2'-propinyl)-4-piperidinol.

(b) 5.3 g. of 1-(β-phenylethyl)-4-(2'-propinyl)-4-piperidinol, 21 ml. of 10% sulphuric acid and 300 mg. of mercury sulphate are stirred for 5 hours at 60°. The mixture is then made alkaline with concentrated sodium hydroxide solution and extracted with chloroform. The chloroform solution is washed with saturated sodium chloride solution, dried and concentrated. Distillation of the residue yields 1-[1'-(β-phenylethyl)-4'-hydroxy-4'-piperidyl]-2-propanone which boils at 135–140° under 0.01 mm. pressure.

The hydrochloride precipitated from a solution of the base is isopropanol/ether with ethereal hydrogen chloride solution melts, after recrystallisation from isopropanol, at 127–129°, compare Example 3.

The following compounds, for example, are obtained in an analogous manner:

1-(1'-benzyl-4'-hydroxy-4'-piperidyl)-2-propanone, B.P.$_{0.01}$ 130–135°, hydrochloride M.P. 166–168°, cf. Example 3;

1-(1'-methyl-4'-hydroxy-4'-piperidyl)-2-propanone, B.P.$_{0.01}$ 75° and B.P.$_{.12}$ 125–130°, hydrochloride M.P. 125–127° (from isopropanol), citrate M.P. 103–105°, cf. Example 1;

3-(1'-methyl-4'-hydroxy-4'-piperidyl)-2-butanone, B.P.$_{0.01}$ 78–80°, citrate M.P. 125–126°;

1-(1'-ethyl-4'-hydroxy-4'-piperidyl)-2-propanone;

1-(1'-n-butyl-4'-hydroxy-4'-piperidyl)-2-propanone;

1-(1'-n-dodecyl-4'-hydroxy-4'-piperidyl)-2-propanone, B.P.$_{0.09}$ 135–138°;

1-[1'-(α-methyl-β-phenylethyl)-4'-hydroxy-4'-piperidyl]-2-propanone;

1-[1'-(γ-phenylpropyl)-4'-hydroxy-4'-piperidyl]-2-propanone.

*Example 12*

(a) 10 g. of mercury are added to 4.05 g. of coarse aluminium powder and well mixed with a stirrer. Unused mercury is then decanted off. The amalgamated aluminium in 25 ml. of abs. tetrahydrofuran and 15 ml. of abs. benzene is boiled for a short time with 15 mg. of mercury chloride and the whole is then stirred for 15 minutes. Of 20.5 ml. of propargyl bromide, enough is added without solvent at 50–60° to start the reaction and raise the temperature towards 70°; afterwards the remaining propargyl bromide, diluted with 35 ml. of abs. benzene, is added. The mixture is stirred for 30 minutes. 50 g. of 1-(β-phenylethyl)-4-piperidone in 150 ml. of abs. benzene are then added dropwise at 20–25° while cooling with ice and the mixture is stirred for another 15 hours. The reaction mixture is then decomposed with about 150 g. of ice and 150 ml. of concentrated hydrochloric acid and the benzene phase is separated.

(b) The hydrochloric acid solution obtained is stirred for 4–6 hours at 40–60°. It is then washed with chloroform, made alkaline with concentrated sodium hydroxide solution and extracted with chloroform. The chloroform solution is dried and concentrated and the residue is distilled whereupon 1-[1'-(β-phenylethyl)-4'-hydroxy-4'-piperidyl]-2-propanone, B.P.$_{0.01}$ 135–140°, is obtained. Compare Examples 3 and 11.

The following compounds can also be obtained analogously to the methods given in Example 12 or 11 (cf. also Example 2):

1-(1'-methyl-4'-hydroxy-4'-piperidyl)-2-butanone, B.P.$_{0.01}$ 95°, citrate M.P. 145–146°;

1-(1'-methyl-4'-hydroxy-4'-piperidyl)-2-pentanone, B.P.$_{0.003}$ 119–121°, citrate M.P. 126–128°;

1-(1'-methyl-4'-hydroxy-4'-piperidyl)-2-hexanone, B.P.$_{0.01}$ 116–118°;

1-(1'-methyl-4'-hydroxy-4'-piperidyl)-3-phenyl-2-propanone, B.P.$_{0.003}$ 132–135°;

2-(1'-methyl-4'-hydroxy-4'-piperidyl)-3-pentanone, B.P.$_{0.008}$ 95–100°, citrate M.P. 130–132°;

1-(1'-n-propyl-4'-hydroxy-4'-piperidyl)-2-propanone, B.P.$_{0.01}$ 80–82°, hydrochloride M.P. 137–139°.

*Example 13*

(a) 12 g. of finely pulverised hydrochloride of 4-piperidinol are added at −20° to 20 g. of finely pulverised sodium hydroxide in 80 ml. of chloroform. 2 ml. of water are then slowly added whereupon the temperature rises. Care is taken, by cooling, that the temperature does not rise above 10°. Sodium sulphate is then added, the reaction mixture is filtered and the filtrate is evaporated in a rotary evaporator finally for 5 minutes under high vacuum whereupon 4-piperidinol remains. 9 g. of magnesium are added to 20 ml. of abs. ether, 0.1 g. of mercury chloride are added and, at −10 to −5°, 44.5 g. of propargyl bromide in 100 ml. of abs. ether are added dropwise, whereupon the whole is stirred for 20 minutes at −5°. 28.95 g. of 4-piperidinol in 250 ml. of abs. benzene are then added dropwise at −5° to 0° whereupon the temperature of the reaction mixture rises. It is stirred for 30 minutes at 0° and then for about 14 hours at room temperature. Ice and glacial acetic acid are added, the benzene phase is removed and extracted with 2 N acetic acid. The acetic acid extracts are combined, shaken with ether and then made alkaline. The base liberated is extracted with chloroform, the chloroform solution is dried and evaporated whereupon 9.3 g. of an oil remain. Distillation yields an oil which boils at 100–140°/0.05 (airbath) which crystallises. The 4-(2'-propinyl)-4-piperidinol melts at 76–78°.

(b) 1.6 g. of the product according to (a) are left to stand for 3 hours at room temperature in 16 ml. of 2 N sulphuric acid and 200 mg. of mercury sulphate. The reaction mixture is made alkaline and extracted with chloroform and the chloroform solution is dried and concentrated. The residue is distilled in a bulb tube whereupon (4'-hydroxy-4'-piperidyl)-2-propanone is obtained. B.P.$_{0.01}$ 70°, M.P. 98–100°.

*Example 14*

(a) 15.35 g. of 4-piperidone hydrate hydrochloride are dissolved in a sulphonating flask in 110 ml. of 1 N sodium bicarbonate solution. While cooling and vibrating at 5–10°, 17.1 g. of benzyloxycarbonyl chloride and 110 ml. of 1 N sodium bicarbonate solution are so added dropwise that the reaction mixture always remains alkaline. Finally it is vibrated for another 1½ hours and the milky emulsion obtained is extracted with ether. The ether solution is extracted twice with 2 N hydrochloric acid and then twice with saturated sodium chloride solution, dried and concentrated and the residue is distilled under high vacuum. The 1-benzyloxycarbonyl-4-piperidone boils at 125–131°/0.004 torr.

(b) 4 g. of magnesium in 6 ml. of abs. ether are placed in a stirring flask and then 19.5 g. of propargyl bromide in 35 ml. of abs. ether are added dropwise while stirring at between 10–15°. Then 19.1 g. of 1-benzyloxycarbonyl-4-piperidone in 80 ml. of abs. benzene are slowly added dropwise at 20–25° whereupon a clot forms which again dissolves on further stirring. The reaction mixture is stirred for another 3 hours. It is then decomposed with ice and 2 N sulphuric acid and extracted with ether. The ether solution is well shaken with 2 N sulphuric acid, dried and concentrated. The 1-benzyloxycarbonyl-4-(2'-propinyl)-4-piperidinol which remains boils at 160–161°/0.01 torr.

(c) 50 g. of 1-benzyloxycarbonyl-4-(2'-propinyl)-4-piperidinol are heated for 1 hour at 35–40° in a mixture of 500 ml. of 20% sulphuric acid and 350 ml. of dioxan which contains 5 g. of mercury sulphate. The dioxan is then evaporated off in vacuo, the residue is extracted with chloroform, the chloroform extract is washed with saturated sodium chloride solution, dried and concentrated. On distilling the residue, 1(1'-benzyloxycarbonyl-4'-hydroxy-4'-piperidyl)-2-propanone is obtained, B.P.$_{0.03}$ 180–190°.

(d) 30.8 g. of 1-(1'-benzyloxycarbonyl-4'-hydroxy-4'-piperidyl)-2-propanone are dissolved in 350 ml. of ethanol and hydrogen is passed through in the presence of 3 g. and, later, of another 1.5 g. of 5% palladium charcoal, until no more carbon dioxide can be traced (about 5 hours). The catalyst is then filtered off, the solution is concentrated, the residue is taken up in methylene chloride, the solution is dried and concentrated and the residue is distilled under high vacuum. The 1-(4'-hydroxy-4'-piperidyl)-2-propanone passes over at 80–100° air bath temperature under 0.01 torr with partial decomposition. M.P. 98–100°, cf. Example 13.

*Example 15*

(a) 9.3 g. of crude 4-(2'-propinyl)-4-piperidinol, obtained according to Example 13(a), are left to stand with 50 ml. of 2 N sulphuric acid and 0.5 g. of mercury-II-sulphate for 15 hours at room temperature. The reaction mixture is then made alkaline with sodium hydroxide solution and extracted with chloroform. The chloroform solution is dried and concentrated. The residue of 4.1 g. is dissolved in 20 ml. of methanol, 10 g. of benzyl bromide are added and the whole is left to stand for 48 hours at 20°. The mixture is then concentrated in vacuo, water is added and the solution, which has an acid reaction, is extracted with ether. The aqueous phase is made alkaline and extracted with chloroform. The chloroform solution is dried and concentrated and the residue is distilled under high vacuum. The 1-(1'-benzyl-4'-hydroxy-4'-piperidyl)-2-propanone boils, in a bulb tube, at 115–125°/0.01 torr. The hydrochloride melts at 166–168°, cf. Examples 3 and 11.

(b) On using 8 g. of methyl iodide instead of benzyl bromide, 1-(1'-methyl-4'-hydroxy-4'-piperidyl)-2-propanone is obtained in an analogous manner. The citrate melts at 103–105°, cf. Examples 1 and 11.

*Example 16*

1 g. of 1-(4'-hydroxy-4'-piperidyl)-2-propanone (cf. Examples 13 and 14) are dissolved in 5 ml. of ethanol, 3 ml. of allyl bromide are added and the whole is left to stand for 24 hours. The reaction mixture is then concentrated, the residue is dissolved in 2 N hydrochloric acid, extracted with ether, the aqueous phase is made alkaline and extracted with chloroform. The chloroform solution is dried, concentrated and the residue is distilled under high vacuum. The 1-(1'-allyl-4'-hydroxy-4'-piperidyl)-2-propanone passes over under 0.01 torr at 105–125° air bath temperature. The citrate melts at 75–78°.

*Example 17*

2 g. of 1-(4'-hydroxy-4'-piperidyl)-2-propanone (cf. Examples 13 and 14), 4 g. of n-hexyl bromide, 1 g. of potassium iodide and 1 g. of potassium carbonate in 25 ml. of acetone are refluxed for 4 hours. The reaction mixture is then concentrated, a little water is added and the alkaline solution is extracted with chloroform. The chloroform solution is dried and concentrated in vacuo and the residue is distilled under high vacuum whereupon 1-(1'-n-hexyl-4'-hydroxy-4'-piperidyl)-2-propanone is obtained. B.P.$_{0.005}$ 98°.

The following compounds, for example, are obtained in an analogous manner:

1 - (1' - n-dodecyl-4'-hydroxy-4'-piperidyl)-2-propanone, B.P.$_{0.09}$ 135–138°, on using 6 ml. of n-dodecyl bromide;

1 - (1' - cyclopropylmethyl-4'-hydroxy-4'-piperidyl)-2-propanone on using 5 g. of iodomethyl-cyclopropane (cf. J. Am. Chem. Soc. 85, 1886 (1963)), and 1 - [1'-(γ-phenylpropyl)-4'-hydroxy-4'-piperidyl]-2-propanone, B.P.$_{0.005}$ 117–120°, on using 5 g. of γ-phenylpropyl bromide.

To produce dosage units for peroral application a compound of Formula I, or a pharmaceutically acceptable addition salt thereof as active substance, the latter is combined, for example, with solid, pulverulent carriers such as lactose, saccharose, sorbitol, mannite; starches such as potato starch, corn starch or amylopectin, also laminaria powder or citrus pulp powder; cellulose derivatives or gelatine, also lubricants such as magnesium or calcium stearate or polyethylene glycols of waxy consistency (Carbowaxes) may be added to form tablets or dragée centers. The latter are coated, for example, with concentrated sugar solutions which, e.g. can contain gum arabic, talcum and/or titanium dioxide, or they are coated with a lacquer dissolved in easily volatile organic solvents or mixtures of organic solvents. Dyestuffs can be added to these coatings, for example, to distinguish between different contents of active substance. Soft gelatine capsules (pearl-shaped closed capsules) and other closed capsules consist, for example, of a mixture of gelatine and glycerine, and contain, e.g., mixtures of the active substance with Carbowax. and hard gelatine capsules contain, for example, granulates of the active substances with solid, pulverulent carriers such as, for example, lactose, saccharose, sorbitol, mannite; starches such as potato starch, corn starch or amylopectin, cellulose derivatives or gelatine, as well as magnesium stearate or stearic acid. Suppositories are employed as dosage units for rectal application. These consist of a combination of the active substance with a neutral fatty base, or also gelatine rectal capsules can be employed which consist of a combination of the active substance with polyethylene glycols of waxy consistency (Carbowaxes).

Syrups or suspensions for peroral application consist, for example, of a solution containing at least about 2% and at most about 20% by weight of active substance, sugar and a mixture of ethanol, water and glycerin as well as propyleneglycol and, for example, aroma, saccharine and/or carboxymethylcellulose (for suspension purpose).

Ampoules for parenteral application by injection advantageously contain a water soluble pharmaceutically acceptable salt of the active substance according to the invention in a concentration of advantageously 0.5–10%, optionally together with suitable stabilising agents and/or buffer substances in aqueous solution.

The following non-limitative examples illustrate the production of typical forms of application of compounds according to the invention.

EXAMPLE I

Manufacturing instructions for the production of a syrup containing 5% (weight per volume) of active substance of Formula I:

|  | G. |
|---|---|
| Active substance | 5.0 |
| Saccharine | 0.6 |
| Sugar | 3.0 |
| Glycerin | 5.0 |
| Distilled water | 10.0 |
| Aroma | 0.1 |

Ethanol 96%, and 100.0 ml.

Sugar and saccharine are dissolved in hot distilled water. On cooling, the solution is made up to weight with water and glycerin is added. The aqueous solution is poured into the solution of active substance and aroma in about 65 ml. of ethanol and then made up to 100 ml. with ethanol.

As active substance for an antitussive syrup can be used, for example 2-(1'-methyl-4'-hydroxy-4'-piperidyl)-3- pentanone, 1 - (1'-methyl-4'-hydroxy-4'-piperidyl)-3-methyl-2 - butanone, α - (1'-methyl-1',2',3',6'-tetrahydro-4'-pyridyl) - acetophenone, 1 - (methyl-1',2',3',6'-tetrahydro-4'-pyridyl)-3-methyl-2-butanone, 1-(1'-methyl-4-acetoxy-4'-piperidyl) - 2 - pentanone and 1-(1'-methyl-4-acetoxy-4'-piperidinyl)-2-butanone or one of their pharmaceutically acceptable acid addition salts.

EXAMPLE II 250 g. of active substance are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed in and the mixture is pressed into 10,000 tablets each weighing 100 mg. and containing 25 mg. of active substance. The tablets can be marketed with break lines if desired to enable a closer adaption of the dosage to be made. As active substance can be used 3-(1'-methyl-1',2',3',6'-tetrahydro-4'-pyridyl) - 3 - pentanone or 1-(1'-methyl-4'-propionoxy-4'-piperidyl)-2-butanone. This gives analgesic tablets.

On using 1-(1'-methyl-4'-acetoxy-4'-piperidyl)-2-pentanone or 2-(1'-methyl-4'-hydroxy-4'-piperidyl)-3-pentanone antitussive tablets are obtained.

EXAMPLE III

A granulate is prepared from 250 g. of active substance, 175.90 g. of lactose and the alcoholic solution of 10 g. of stearic acid. After drying, the granulate is mixed with 56.60 g. of colloidal silicon dioxide, 165 g. of talcum, 20 g. of potato starch and 2.50 g. of magnesium stearate and pressed into 10,000 dragée centers. These are first coated with 6 g. of shellack, then with a concentrated syrup of 502.28 g. of crystallized saccharose, 10 g. of gum arabic, 0.22 g. of dyestuff of 1.5 g. of titanium dioxide, and dried. The dragées obtained each weigh 120 mg. and contain 25 mg. of 1'-(1'-ethyl-4'-propionoxy-4'-piperidyl)-2-butanone or 3-(1-methyl-1',2',3',6'-tetrahydro-4'-pyridyl)-2-butanone. These dragées can serve as analgesics.

In a similar manner on using 1-(1'-methyl-4'-acetoxy-4'-piperidyl)-2-pentanone as active substance, antitussive dragées are obtained.

EXAMPLE IV 1.0 g. of 1-(1'-methyl-1',2',3',6'-tetrahydro-4'-pyridyl)-2-butanone-citrate and 0.10 g. of ascorbic acid, are dissolved in distilled water up to 100 ml. This solution is used to fill ampoules, each e.g. of 1 ml. which corresponds to a content of 10 mg. of active substance, which are sterilized by heating in the usual way.

We claim:

1. A member selected from the group consisting of a ketone of the formula

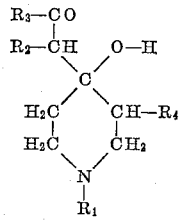

wherein
$R_1$ is a member selected from the group consisting of hydrogen, alkyl of at most 12 carbon atoms, alkenyl of 3 to 5 carbon atoms, cyclopropylmethyl, and phenylalkyl of a total of 7 to 9 carbon atoms,
$R_2$ is a member selected from the group consisting of hydrogen and methyl,
$R_3$ is a member selected from the group consisting of alkyl of at most 4 carbon atoms, phenyl, phenylalkyl of a total of 7 to 9 carbon atoms, and styryl, and
$R_2$ and $R_3$ taken together represent a member selected from the group consisting of trimethylene, tetramethylene and 1-methyl-tetramethylene, and
$R_4$ represents a member selected from the group consisting of hydrogen and the methyl radical, and a pharmaceutically acceptable acid addition salt thereof.

2. A member selected from the group consisting of a ketone of the formula

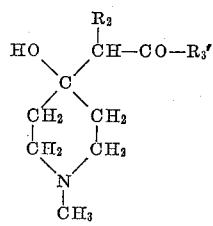

wherein $R_2$ is a member selected from the group consisting of hydrogen and methyl and $R_3'$ represents alkyl of from 1 to 4 carbon atoms and a pharmaceutically acceptable acid addition salt thereof.

3. A member according to claim 2 wherein said acid addition salt is the citrate.

4. 1-(1'-methyl-4'-hydroxy-4'-piperidyl)-2-butanone.
5. 1-(1'-methyl-4'-hydroxy-4'-piperidyl)-2-propanone.
6. 1-(1'-methyl-4'-hydroxy-4'-piperidyl)-2-pentanone.
7. 2-(1'-methyl-4'-hydroxy-4'-piperidyl)-3-pentanone.
8. 1-(1'-methyl-4'-hydroxy-4'-piperidyl) - 3 - methyl-2-butanone.

9. A process for the production of a compound of the hydrogen and methyl,

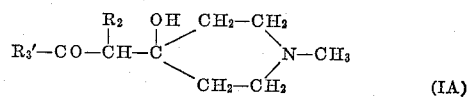

wherein
$R_2$ is a member selected from the group consisting of hydrogen and methyl,
$R_3$ is alkyl of from 1 to 4 carbon atoms and only one of $R_2$ and $R_3'$ is methyl, comprising
  (a) mixing and thereby reacting a 4-piperidone of the formula

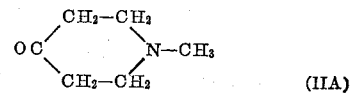

with a ketone of the formula

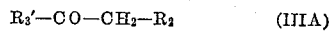

wherein
  $R_1$, $R_2$ and $R_3'$ have the meanings given above and only one of $R_2$ and $R_3'$ is methyl in the presence of a catalyst of the aldol condensation tyne.
  (b) heating the mixture at a temperature range of from 20° to 80° C. at normal pressure and
  (c) recovering the compound of Formula IA from the reaction mixture.

References Cited

UNITED STATES PATENTS

| | | | |
|---|---|---|---|
| 2,798,073 | 7/1957 | Lee et al. | 260—294 |
| 3,029,244 | 4/1962 | Lyle et al. | 260—294 |
| 3,081,309 | 3/1963 | Prost | 260—294 |

OTHER REFERENCES

Krausch et al., Organic Name Reactions (1964), pages 6–8, Wiley, New York (original published in Germany, 1962).

NORMA S. MILESTONE, *Acting Primary Examiner.*

W. A. MODANCE, *Examiner.*

A. D. SPEVACK, *Assistant Examiner.*